United States Patent Office 3,303,199
Patented Feb. 7, 1967

3,303,199
CERTAIN IMIDAZOLONE DERIVATIVES AND
PROCESS FOR MAKING SAME
Karl J. Doebel, Ossining, N.Y., and Andre R. Gagneux,
Basel, Switzerland, assignors to Geigy Chemical Corporation, Greenburgh, N.Y., a corporation of Delaware
No Drawing. Continuation of application Ser. No.
295,245, July 15, 1963. This application Oct. 19, 1965,
Ser. No. 498,117
24 Claims. (Cl. 260—309.6)

This application is a continuation of application Serial No. 295,245, filed July 15, 1963, now abandoned, which is a continuation-in-part of application Serial No. 204,643, filed June 22, 1962, now abandoned.

This invention relates to certain novel derivatives of imidazolone, which possess valuable pharmacological properties and are useful as pharmaceutical agents. This invention also pertains to processes for their manufacture.

More particularly, this invention resides in substituted imidazolones which may be represented by the following general formula:

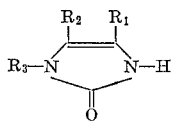

(I)

In this formula:

$R_1$ represents hydrogen, alkyl, hydroxyalkyl, carboxy, carbalkoxy, carboxamido, alkanoyl or cyano;
$R_2$ denotes alkyl or aryl groups;
$R_3$ stand for aliphatic, cycloalkyl, aralkyl or aryl groups.

More specifically, in the compounds of the above formula $R_1$ is preferably hydrogen or lower alkyl; also lower hydroxyalkyl, carboxy, lower carbalkoxy, carboxamido, lower alkanoyl or cyano; $R_2$ is lower alkyl or phenyl; and $R_3$ is either an aliphatic group, such as, an alkyl group having up to 12 carbon atoms, viz., methyl, ethyl, n-propyl, isopropyl, n-butyl, n-hexyl, n-octyl, n-dodecyl, etc., or one of the following aliphatic groups: a lower alkenyl group, such as, vinyl, allyl, methallyl, etc., or an ω,ω-di(lower)alkoxy(lower)alkylene group, such as, dimethoxyethyl, dimethoxypropyl, bisethoxyethyl, bisethoxypropyl, etc., or an ω-amino(lower)alkyl group, such as, a di(lower)alkylamino(lower)alkyl group, viz., dimethylaminoethyl, diethylaminopropyl, etc., or an N-heterocyclic substituted (lower)alkyl group, viz., 2-(N-hexamethyleneimino)ethyl, 3-(N-pyrrolidino)propyl, 2-(N-piperidino)ethyl, etc.; or a cycloalkyl group, such as, cyclopentyl, cyclohexyl, but also cycloheptyl, etc.; or an aralkyl group, such as, benzyl, phenethyl, phenpropyl, etc., or an aryl group, such as, phenyl, biphenyl or naphthyl, etc. These aralkyl or aryl groups can carry, for example, from one to three of the following ring substituents: halogen, such as, fluorine, chlorine or bromine; trifluoromethyl; lower alkyl; lower alkenyl; lower alkoxy-(lower) alkyl; hydroxy; lower alkoxy, preferably, methoxy; carboxy; lower carbalkoxy; lower alkanoyl, preferably acetyl; lower acyloxy, preferably acetoxy; cyano; nitro; amino; lower acylamido, preferably acetamido; lower dialkylamino; lower dialkylamino(lower)alkyl or lower alkylmercapto. A methylenedioxy substituent is also within the purview of the inventive concept.

The term "lower" as used herein in connection with definitions of substituents, signifies that the groups in question have a carbon content of $C_1$ to $C_6$ and are inclusive of straight chains and branched chains.

Briefly, the compounds of this invention may be synthesized directly by reacting a suitable primary amine, formaldehyde and an α-isonitrosoketone or by further modifying the condensation products directly obtained.

More specifically, compounds of the above formula wherein $R_1$ is lower alkyl, lower carbalkoxy, alkanoyl, carboxamido or cyano can be prepared directly by reacting a suitably substituted primary amine, formaldehyde and suitably substituted α-isonitrosoketone in accordance with the following equation:

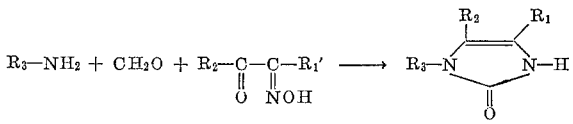

wherein $R_2$ and $R_3$ are as defined hereinabove, and
$R_1'$ is lower alkyl, lower carbalkoxy, lower alkanoyl carboxamido or cyano.

This synthesis may be described in greater detail as follows: The above-indicated primary amine, formaldehyde, preferably as aqueous solution or paraformaldehyde and the α-isonitrosoketone, e.g., 3-isonitroso-2-butanone or ethyl isonitrosoacetoacetate, are mixed in a suitable reaction medium, such as, polar solvents, e.g., lower alkanols, acetonitrile, water etc., and the reaction mixture is stirred and/or refluxed. This procedure may be modified in that the primary amine and the formaldehyde are first mixed in the reaction medium chosen and the reaction mixture is stirred and/or refluxed in order to assure Schiff-base formation. The mixture is then cooled and the α-isonitrosoketone, dissolved in the same solvent as the other reactants, is added and refluxing and/or stirring is continued and may be carried on for up to 8 hours or more. The desired reaction product is then worked up and purified in accordance with well-known prior art procedures.

It is to be understood, however, that there are no critical limitations regarding reaction time and other reaction conditions other than those stated above and that any other manipulative modifications which are possible in the practice of the subject process, are within the ambit of this invention.

Compounds of the above formula wherein $R_1$ is carboxy are obtained by saponifying a 1,5-disubstituted-4-lower carbalkoxy-2-imidazolone, the condensation product of a primary amine, formaldehyde and an α-isonitrosoketone of the formula

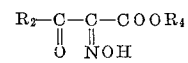

wherein $R_4$ is lower alkyl and $R_2$ has the significance given above. The 1,5-disubstituted-4-carboxy-2-imidazolone obtained can be decarboxylated by means of pyrolysis or by treatment with a tertiary amine base, such as, quinoline, etc. and a metal catalyst, such as, copper powder, etc.

It is further obvious to those skilled in the art that additional secondary changes in the 4-carbalkoxy group of the subject compounds can be effected in accordance with well-known prior art procedures. Thus, for example, the 4-(lower)carbalkoxy group can be converted to the following groups: 4-carboxamido, 4-(lower)hydroxyalkyl, etc.

Alternatively, substituted imidazolones of the above Formula I wherein $R_1$ stands for hydrogen, may be prepared, by first reacting a suitable substituted isocyanate with a 1-amino-2-hydroxy alkane and subjecting then the reaction product to an oxidation. This synthesis may be graphically presented by the following equation:

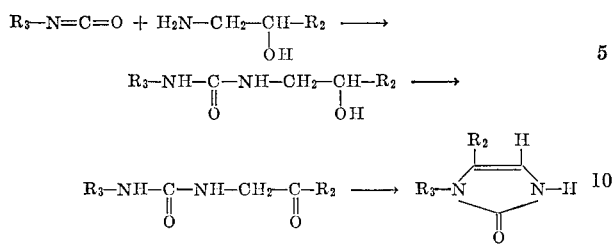

wherein the symbols used are as defined hereinabove.

The molecular structure of the subject compounds as drawn above was proven by an independent and unequivocal synthesis, the above-described alternate method of preparation, as follows:

Phenylisocyanate was reacted with 2-hydroxypropylamine and the reaction product subjected to an Oppenauer oxidation to yield 1-phenyl-5-methyl-2-imidazolone. Physical-chemical data (UV, IR, NMR-spectra) proved that the material prepared in accordance with the unequivocal synthesis is identical to the compound prepared in accordance with Example 11 below.

The present invention comprehends not only the above-described derivatives of imidazolone in their free base form, but it also includes pharmaceutically acceptable non-toxic acid addition salts which may be formed from said compounds where they possess functional groups which are conducive to the formation of such salts, in accordance with conventional practice, by using appropriate inorganic and organic acids, such as hydrohalic acids, especially hydrochloric and hydrobromic acids, sulfuric and phosphoric acids as well as acetic, lactic, succinic, malic, aconitic, aminoacetic, phthalic and tartaric acids.

The quaternary ammonium salts of compounds of the present invention, which are pharmaceutically acceptable, can be obtained by addition to those corresponding free bases which possess functional groups which lend themselves to quaternization, of alkyl or aralkyl esters of inorganic sulfonic acids, including such compounds as methyl chloride, methyl bromide, methyl iodide, ethyl bromide, propyl bromide, octyl bromide, benzyl chloride, benzyl bromide, methyl sulfate, methyl benzenesulfonate, and methyl p-toluenesulfonate, giving the methochloride, methobromide, methoiodide, ethobromide, propobromide, octobromide, benzochloride, benzobromide, methosulfate, methobenzenesulfonate, and metho-p-toluene sulfonate salts, respectively.

As mentioned above, the subject compounds possess valuable pharmacological properties; they exhibit analgesic, CNS depressant, such as, transquilizing, sedative and muscle relaxant, antipyretic and anti-inflammatory effects.

Merely by way of illustration, the compound of Example 10, 1-(p-methoxyphenyl)-5-methyl-2-imidazolone, which has an $LD_{50}$ of >1250 mg./kg. p.o. mouse, exhibits analgesic activity in the mouse-tail flick test and in the Haffner pinch test, shows antipyretic and anti-inflammatory activity at oral doses of 100 mg./kg. and more at higher doses (500 mg./kg.-1250 mg./kg. p.o.). It diminishes reflexes and spontaneous locomotor activity. With the highest dose applicable (1250 mg./kg. p.o.) there is no lethality. The compound of Example 28, 1-(p-tolyl)-5-methyl-2-imidazolone, which has an $LD_{50}$ of ca. 1250 mg./kg. p.o. mouse, at 100 mg./kg. p.o. in mice increases the pain threshold between 32.8 and 63.8% in the grid-shock test. At the same dose it causes a 61% decrease in the number of stretches in the acetic acid stretch test and a 40% protection in the Haffner analgesia test. At 50 mg./kg. p.o. it has anti-pyretic effect in rats yeast fever: 3 hr. average of −3.8° F. At 250 mg./kg. p.o. in mice in the mouse tail flick test it caused a maximal increase of pain threshold of 43.9%.

These new compounds and the methods for their preparation may be exemplified more fully by the following illustrative examples, the scope of the invention is, however, not limited thereto. The temperatures therein are given in degrees centigrade.

*Example 1.—1-(p-methoxyphenyl)-4-carbethoxy-5-methyl-2-imidazolone*

A. A formaldehyde solution (38%, 31.4 g.) and 38.7 g. of p-anisidine were mixed in 40 ml. of ethanol and refluxed for one-half hour, while stirring. The mixture was then cooled and a solution of 50 g. of ethyl isonitrosoacetoacetate in 40. ml. of ethanol run in at once. Refluxing and stirring was then continued for 8 hours. The mixture was then cooled and the crystalline precipitate collected on Büchner funnel, washed with ether and recrystallized from ethanol or methanol/water (charcoal); M.P. 188–190°. Yield: 70–80%. For analysis the sample was dried 8 hours at 100°/0.01 mm.:

Analysis for $C_{14}H_{16}N_2O_4$ (M.W. 276.30).—Calc'd: C, 60.80; H, 5.83; N, 10.12. Found: C, 60.71; H, 5.87; N, 10.30. U.V. (ethanol): $\lambda_1$ max.: 219 m$\mu$, $\epsilon$9350; $\lambda_2$ max.: 276 m$\mu$; $\epsilon$17,800.

B. A formaldehyde solution (37%, 31.4 g.) and 38.7 g. of p-anisidine were mixed in 40 ml. of ethanol and stirred 5–10 minutes at room temperature. Then, the solution of 50 g. of ethyl isonitrosoacetoacetate in 60 ml. of ethanol was added at once and the resulting mixture was stirred and refluxed for 8 hours. The reaction mixture was then worked up as under A, yielding 65% of the desired product; M.P. 188–190°.

C. A mixture of 50 g. of ethyl isonitrosoacetoacetate, 31.4 g. of formaldehyde solution (37%) and 38.7 g. of p-anisidine was refluxed in 45 ml. of ethanol for 8 hours. Upon cooling the condensation product separated immediately and was collected on a Büchner funnel and then recrystallized from ethanol/water. Yield: 75%; M.P. 188–190°.

*Example 2.—1-(p-chlorophenyl)-4-carbethoxy-5-methyl-2-imidazolone* p-Chloroaniline (51.0 g.) and 36.0 g. of aqueous formaldehyde (38%) was mixed with 50 ml. of ethanol and the mixture stirred and refluxed for one-half hour. Upon cooling the Schiff-base precipitated. A solution of 63.6 g. of ethyl isonitrosoacetoacetate in 50 ml. of ethanol was then added at once and stirring and refluxing continued for 8 hours. Upon cooling the reaction product separated out in crystalline form and was collected on a Büchner funnel, washed with ether and redissolved in the minimum amount of methanol. Charcoal was then added to remove coloring impurities and the charcoal removed by filtration. The hot filtrate was diluted with water until the mixture became slightly turbid. Upon standing 75 g. of material crystallized out. Yield: 66.5%; M.P. 215–217°.

U.V. (ethanol): $\lambda_1$ max: 216 m$\mu$; $\epsilon$ 10,350; $\lambda_2$ max: 276 m$\mu$; $\epsilon$ 15,260. For analysis the sample was dried 12 hours at 100°/0.1 mm.

Analysis for $C_{13}H_{13}ClN_2O_3$ (M.W. 280.71)—Calc'd: C, 55.7; H, 4.67; Cl, 12.61; N, 9.98. Found: C, 56.00; H, 4.92; Cl, 12.51; N, 10.26.

*Example 3.—1-phenyl-4-carbethoxy-5-methyl-2-imidazolone*

Aniline (18.6 g.) was dissolved in 30 ml. of ethanol and 20 g. of 38% formaldehyde solution added. An exothermic reaction occurred which subsided after a couple of minutes. The mixture was then refluxed and stirred for 20 minutes and then cooled down. 31.8 g. of ethyl isonitrosoacetoacetate was then dissolved in 50 ml. of ethanol and the solution added at once. Stirring and refluxing was then resumed for 8 hours. Some precipitation occurred during this period and this material was removed by filtration after the specified time. The clear filtrate was cooled and since no crystallization occurred the solvent was removed in vacuo. The residue was triturated with ether and the crystals were collected on a Büchner funnel and recrystallized from isopropanol, then twice from ethanol. 9.76 g. of material, M.P. 188–189°, was obtained. U.V. (ethanol): λ max: 276 mμ; ε 14,800. The sample was analyzed after drying 8 hours at 90°/0.1 mm.

Analysis for $C_{13}H_{14}N_2O_3$ (M.W. 246.27)—Calc'd: C, 63.40, H, 5.73, N, 11.38. Found: C, 63.27, H, 5.99, N, 11.53.

*Example 4.—1-(m-nitrophenyl)-4-carbethoxy-5-methyl-2-imidazolone* m-Nitroaniline (13.8 g.) is dissolved in 70 ml. of ethanol and 8.5 g. of 37% aqueous formaldehyde solution added. After a few minutes, 15.9 g. of ethyl isonitrosoacetoacetate is added and the mixture stirred and refluxed for 8 hours. Upon cooling the yellow precipitate is collected on a Büchner funnel and washed with a little ethanol. Recrystallization from ethanol removed a by-product and 5.8 g. of pale yellow crystals, M.P. 228–229°, were obtained. U.V. (ethanol); $λ_1$ max: 206 mμ; ε 16,000; $λ_2$ max: 268 mμ; ε 16,400. For analysis the sample was dried for 8 hours at 100°/0.1 mm.

Analysis for $C_{13}H_{13}N_3O_5$ (M.W. 291.27)—Calc'd: C, 53.70, H, 4.51, N, 14.42. Found: C, 53.54, H, 4.59, N, 14.31.

*Example 5.—1-(m-aminophenyl)-4-carbethoxy-5-methyl-2-imidazolone*

1-(m-nitrophenyl)-4-carbethoxy-5-methyl-2-imidazolone (2.7 g.) is suspended in 50 ml. of 3 N hydrochloric acid and 30 ml. of water. Palladium on charcoal catalyst (5%–500 mg.) is added and the suspension shaken under hydrogen at room temperature. Within 3 hours 625 ml. of hydrogen were consumed (theoretical uptake 622 ml. of hydrogen). The catalyst is then removed by filtration and the filtrate neutralized with saturated potassium carbonate solution. The amine precipitates in crystalline form and is collected on a Büchner funnel, washed with water and recrystallized from ethanol. Material obtained: 1.7 g.; M.P. 264–265°. U.V. (ethanol): $λ_1$ max: 245 mμ; ε 13,800; $λ_2$ max: 276 mμ; ε 15,700.

Analysis for $C_{13}H_{15}N_3O_3$ (M.W. 261.28)—Calc'd: C, 59.80, H, 5.78, N, 16.08. Found: C, 59.80, H, 5.86, N, 16.32.

*Example 6.—1-(p-methoxyphenyl)-4-carboxy-5-methyl-2-imidazolone*

1-(p-methoxyphenyl)-4-carbethoxy-5-methyl-2-imidazolone (108 g.) was dissolved in 2200 ml. of 3 N sodium hydroxide and refluxed for 12 hours. The solution is then treated with charcoal and filtered over a bed of Speedex. The filtrate is carefully neutralized with 5 N hydrochloric acid and the precipitated material collected on a Büchner funnel and washed extensively with water. The yield is quantitative. The crude material has M.P. 241–243° (dec.). It can be recrystallized from ethanol/water or from butanol to give crystals; M.P. 252° (dec.). U.V. (ethanol): $λ_1$ max: 221 mμ; ε 10,350; $λ_2$ max: 268 mμ; ε 14,200.

Analysis for $C_{12}H_{12}N_2O_4$ (M.W. 248.24)—Calc'd: C, 58.10, H, 4.88, N, 11.28. Found: C, 58.26, H, 5.07, N, 11.19.

*Example 7.—1-(p-chlorophenyl)-4-carboxy-5-methyl-2-imidazolone*

1-(p-chlorophenyl)-4-carbethoxy-5-methyl-2-imidazolone (40 g.) was refluxed with 900 ml. of 3 N sodium hydroxide for 12 hours. After cooling, the solution is treated with charcoal and filtered over Speedex. The filtrate is then acidified and the precipitated material collected on a Büchner funnel, washed with water and dried in vacuo. Material obtained was 35.0 g.; M.P. 277° (dec.). This can be recrystallized from dioxane without change in melting point. U.V. (ethanol): $λ_1$ max: 216 mμ; ε 11,500; $λ_2$ max: 272 mμ; ε 12,000.

Analysis for $C_{11}H_9ClN_2O_3$ (M.W. 252.66)—Calc'd: C, 52.20, H, 3.59, Cl, 14.03, N, 11.10. Found: C, 52.49, H, 3.71, Cl, 13.91, N, 11.36.

*Example 8.—1-phenyl-4-carboxy-5-methyl-2-imidazolone*

1-phenyl-4-carbethoxy-5-methyl-2-imidazolone (12.50 g.) is dissolved in 300 ml. of 3 N sodium hydroxide and refluxed for 12 hours. After cooling the solution was treated with charcoal and then filtered over Speedex. The filtrate was acidified and the precipitate collected on a Büchner funnel. The material was carefully washed with water and dried in vacuo at 60°. After recrystallization from n-butanol 6.55 g. of material was obtained; M.P. 244–245° (dec.). U.V. (ethanol): $λ_1$ max: 206 mμ; ε 10,550; $λ_2$ max: 270 mμ; ε 11,550.

Analysis for $C_{11}H_{10}N_2O_3$ (M.W. 218.20)—Calc'd: C, 60.50, H, 4.62, N, 12.81. Found: C, 60.96, H, 4.84, N, 12.55.

*Example 9.—1-(p-methoxyphenyl)-5-methyl-2-imidazolone*

1-(p-methoxyphenyl)-4-carboxy-5-methyl-2-imidazolone (22.2 g.) is dissolved in 200 ml. redistilled quinoline and a spoonful of copper powder added. The mixture is then refluxed for 2 hours and then filtered while hot. Quinoline is removed by distillation in vacuo (12 mm. Hg) and the residue is taken up in chloroform. The solution is carefully washed with 3 N sulfuric acid and then with water and dried over sodium sulfate. The solvent is removed in vacuo and the residue is recrystallized several times from ethanol. Final recrystallization from methanol gave 7.3 g. glittering needles; M.P. 195–196°. U.V. (ethanol): λ max: 240 mμ; ε 6580.

Analysis for $C_{11}H_{12}N_2O_2$ (M.W. 204.23)—Calc'd: C, 64.8; H, 5.93; N, 13.71. Found: C, 64.58; H, 6.11; N, 13.86.

*Example 10.—1-(p-chlorophenyl)-5-methyl-2-imidazolone*

(A) *With quinoline and copper powder.*—1-(p-chlorophenyl)-4-carboxy-5-methyl-2-imidazolone (5 g.) is dissolved in 50 ml. of pure quinoline and a little copper powder added. The mixture is refluxed for 1½ hours and then filtered hot. The quinoline is removed by vacuum distillation and the residue is dissolved in chloroform. This solution is carefully washed with 3 N sulfuric acid, water, 2 N sodium bicarbonate solution and again with water and then dried over sodium sulfate. The solvent is then removed in vacuo. The residue was taken up in ethanol, treated with charcoal and the latter removed by filtration. From the filtrate 1.6 g. of material, M.P. 186–188°, was obtained.

(B) *By thermal decarboxylation.*—5 g. of the acid was heated in a metal bath for 7 minutes at 277°. A brisk evolution of carbon dioxide occurred and ceased rapidly. The material was cooled and crystallized immediately. Recrystallization from ethanol gave 3.0 g. of material, M.P. 185–186°. U.V. (ethanol): λ max: 262 mμ; ε 3480.

Analysis for $C_{10}H_9ClN_2O$ (M.W. 208.65)—Calc'd: C, 57.6; H, 4.34; Cl, 17.00; N, 13.43. Found: C, 57.74; H, 4.37; Cl, 17.00; N, 13.57.

*Example 11.—1-phenyl-5-methyl-2-imidazolone*

1-phenyl-4-carboxy-5-methyl-2-imidazolone (5 g.) is dissolved in 50 ml. of pure quinoline and a little copper powder added. The mixture is then refluxed for 1 hour, filtered hot and the filtrate concentrated to near dryness by distillation in vacuo. The residue was taken up in chloroform and the solution washed carefully with 3 N sulfuric acid and water. After drying over sodium sulfate the solvent was removed in vacuo and the residue recrystallized several times from ethanol. U.V. (ethanol): λ max: 253 mμ; ε 3140.

Analysis for $C_{10}H_{10}N_2O$ (M.W. 174.19)—Calc'd: C, 69.00; H, 5.78; N, 16.08. Found: C, 68.89; H, 6.11; N, 15.75.

*Example 12.—1-(m-chlorophenyl)-5-methyl-2-imidazolone* m-Chloroaniline (12.75 g.) and 9.0 g. of a 37% aqueous formaldehyde solution were dissolved in 40 ml. of ethanol and then refluxed for 30 minutes. The mixture was then cooled and 15.9 g. of ethyl isonitrosoacetoacetate in 40 ml. of ethanol was added at once and stirring and refluxing continued for 8 hours. Upon cooling the crystalline precipitate was collected on a Büchner funnel and the filtrate evaporated in vacuo to dryness. Ether was added to the residue and the second batch of crystals combined with the first. The combined materials were recrystallized from ethanol to yield a jelly-like material which was directly saponified with 3 N sodium hydroxide to yield 2.8 g. of 1-(m-chlorophenyl)-4-carboxy-5-methyl-2-imidazolone, M.P. 248° (dec.). This compound was decarboxylated by heating it in a metal bath at 250° for 3 minutes. After cooling, the crystalline reaction product was dissolved in hot ethanol and treated with charcoal. After filtration the ethanol solution was concentrated and 1.4 g. of material obtained; M.P. 187–188°. U.V. (ethanol): λ max: 264 mμ; ε 2670.

Analysis for $C_{10}H_9ClN_2O$ (M.W. 208.65)—Calc'd: C, 57.6; H, 4.36; Cl, 17.00; N, 13.43. Found: C, 57.51; H, 4.52; Cl, 16.83; N, 13.18.

*Example 13.—1-(p-methoxyphenyl)-4,5-dimethyl-2-imidazolone* p-Anisidine (8.79 g.) and 6.0 g. of 37% aqueous formaldehyde solution are dissolved in 40 ml. of ethanol. The mixture is stirred and refluxed for 10 minutes, cooled and the solution of 7.2 g. of 3-isonitroso-2-butanone in 20 ml. of ethanol added at once. Stirring and refluxing is then continued for 8 hours. After cooling, the mixture is treated with charcoal and the filtrate freed from solvent in vacuo. The residual oil (19.3 g.) was taken up in ether and crystallization occurred spontaneously within minutes. The material obtained (15.4 g.) was collected on a Büchner funnel which is a mixture of two substances having a crude melting point of 150–166°. Fractional crystallization from benzene gave a compound, M.P. 178–180°, which is chemically 2-(p-methoxyphenylimino - 3 - isonitrosobutane). From the mother liquors 1-(p-methoxyphenyl)-4,5-dimethyl - 2 - imidazolone, M.P. 243–245°, could be isolated by recrystallization from ethanol. U.V. (ethanol): λ₁ max: 219 mμ; ε 17,100; λ₁ max: 246 mμ; ε 5250.

Analysis for $C_{12}H_{14}N_2O_2$ (M.W. 218.26)—Calc'd: C, 66.0; H, 6.47; N, 12.82. Found: C, 66.30; H, 6.70; N, 12.55.

This experiment was also carried out using acetonitrile instead of ethanol as medium.

*Example 14.—1-(p-hydroxyphenyl)-4-carbethoxy-5-methyl-2-imidazolone* p-Aminophenol (5.45 g.), 4.8 ml. of aqueous formaldehyde solution (37%) and 8.0 g. of ethyl isonitrosoacetoacetate were heated to reflux in 30 ml. of ethanol for 30 minutes whereafter a heavy precipitate was collected. Recrystallization from ethanol after cleaning with charcoal and Celite gave 65% of the desired compound; M.P. 204° (dec.). U.V. (methanol): λ max: 228 mμ; ε 20,000.

Analysis for $C_{13}H_{14}N_2O_4$ (M.W. 262.27)—Calc'd: C, 59.53; H, 5.38; N, 10.68. Found: C, 58.96; H, 5.67; N, 10.45.

*Example 15.—1-(o-chlorophenyl)-4-carboxy-5-methyl-2-imidazolone* o-Chloroaniline (25.5 g.), 18 g. of aqueous formaldehyde solution (37%) and 31.8 g. of ethyl isonitrosoacetoacetate were condensed as in Example 1A. The initially formed 1-(o-chlorophenyl)-4-carbethoxy - 5 - methyl - 2 - imidazolone was then directly saponified with 3 N sodium hydroxide as described in Example 7. The desired compound obtained weighed 19.5 g. After recrystallization from n-butanol it melted at 257–258° (dec.).

Analysis for $C_{11}H_9ClN_2O_3$ (M.W. 252.66)—Calc'd: Cl, 14.02; N, 11.08. Found: Cl, 14.09; N, 10.84.

*Example 16.—1-(o-chlorophenyl)-5-methyl-2-imidazolone*

1-(o-chlorophenyl)-4-carboxy-5-methyl-2 - imidazolone (5.05 g.) was heated to 230° until carbon dioxide evolution had ceased. The residue was taken up in ethanol and crystallized to yield 3.2 g. of pure material; M.P. 198–199°. U.V. (ethanol): λ max: 264 mμ; ε 2700.

Analysis for $C_{10}H_9ClN_2O$ (M.W. 208.58)—Calc'd.: C, 57.65; H, 4.32; Cl, 17.00; N, 13.43. Found: C, 57.45; H, 4.56; Cl, 16.97; N, 13.57.

*Example 17.—1-(o-methoxyphenyl)-4-carbethoxy-5-methyl-2-imidazolone* o-Methoxyaniline (6.15 g.), 4.8 ml. of aqueous formaldehyde solution (37%) and 8.0 g. of ethyl isonitrosoacetoacetate were condensed as in Example 1A. The resulting product was obtained in crystalline form from di-isopropylether; M.P. 185–190°. I.R. (CHCl₃): ν (>C=O) 1690 cm.⁻¹.

*Example 18.—1-(p-tolyl)-4-carbethoxy-5-methyl-2-imidazolone* p-Toluidine (5.35 g.), 4.8 ml. of aqueous formaldehyde solution (37%) and 8.0 g. of ethyl isonitrosoacetoacetate were condensed as in Example 1A. The desired compound was obtained in 50% yield after recrystallization from ethanol; M.P. 200–202°. U.V. (methanol): λ max: 274 mμ; ε 18,000. I.R. (CHCl₃): ν (>C=O) 1700 cm.⁻¹.

*Example 19.—1-(3′,4′,5′-trimethoxyphenyl)-4-carbethoxy-5-methyl-2-imidazolone*

3,4,5-trimethoxyaniline (9.35 g.), 4.8 ml. of aqueous formaldehyde solution (37%) and 8.0 g. of ethyl isonitrosoacetoacetate were condensed as in Example 1A. The desired condensation product was recrystallized from ethanol and obtained as crystals; M.P. 173–175°. I.R. (Nujol): ν (>C=O) 1700 cm.⁻¹.

Analysis for $C_{16}H_{20}N_2O_6$ (M.W. 336.34)—Calc'd: C, 57.13; H, 5.99; N, 8.33. Found: C, 56.94; H, 6.06; N, 8.37.

*Example 20.—1-(p-methoxybenzyl)-4-carbethoxy-5-methyl-2-imidazolone* p-Methoxybenzylamine (13.7 g.), 9.5 g. of aqueous formaldehyde solution (37%) and 15.9 g. of ethyl isonitrosoacetoacetate were condensed as described in Example 1C. Crystallization was first induced by addition of ether. After recrystallization from benzene/cyclohexane 9.2 g. of needles, M.P. 140–141.5°, were obtained. U.V. (ethanol): λ₁ max: 223 mμ; ε 13,800; λ₂ max: 273 mμ; ε 18,600.

*Example 21.—1-(p-methoxybenzyl)-4-carboxy-5-methyl-2-imidazolone*

1 - (p - methoxybenzyl) - 4 - carbethoxy-5-methyl-2-imidazolone (6.1 g.) was saponified as described in Example 6. The free acid was obtained in crystal, M.P. 235° (dec.).

*Example 22.—1-(p-methoxybenzyl)-5-methyl-2-imidazolone*

1 - (p - methoxybenzyl) - 4 - carboxy - 5 - methyl-2-imidazolone (5.3 g.) was subjected to pyrolysis as described in Example 10B. Obtained was 3.5 g. of product, M.P. 202–203°, after recrystallization from methanol. U.V. (ethanol): λ₁ max: 221 mμ; ε 16,400; λ₂ max: 273 mμ; ε 1470.

Analysis for $C_{12}H_{14}N_2O_2$ (M.W. 218.26)—Calc'd: C, 66.0; H, 6.46; N, 12.82. Found: C, 65.97; H, 6.61; N, 12.75.

*Example 23.—1-cyclohexyl-4-carbethoxy-5-methyl-2-imidazolone*

Cyclohexylamine (4.96 g.), 4.8 ml. of aqueous formaldehyde solution (37%) and 8.0 g. of ethyl isonitrosoacetoacetate were condensed in 20 ml. of ethanol as described in Example 1A. After recrystallization from ethanol, a 60% yield of crystals, M.P. 190–192°, was obtained. I.R. ($CHCl_3$) $\nu$ ($>C=O$) 1695 cm.$^{-1}$.

*Example 24.—1-butyl-4-carbethoxy-5-methyl-2-imidazolone*

Butylamine (22.0 g.), 29.0 ml. of aqueous formaldehyde solution (37%) and 47.5 g. of ethyl isonitrosoacetoacetate were condensed as in Example 1A. The desired compound was obtained in 70% yield, after recrystallization from ether; M.P. 99–101°. U.V. (methanol)— $\lambda$ max: 271 m$\mu$; $\epsilon$ 14,000. I.R. ($CHCl_3$): $\nu$ ($>C=O$) 1710, 1690 cm.$^{-1}$.

*Example 25.—1-butyl-4-carboxy-5-methyl-2-imidazolone*

1-butyl-4-carbethoxy-5-methyl-2-imidazolone (36 g.) was saponified in 500 ml. of 3 N sodium hydroxide. After 1 hour the mixture was cooled and acidified and the precipitated acid collected and recrystallized from dioxane/ether. Yield: 90%; M.P. 198–199° (dec.). I.R. ($CHCl_3$) $\nu$ ($>C=O$) 1700 cm.$^{-1}$.

*Example 26.—1-butyl-5-methyl-2-imidazolone*

1-butyl-4-carboxy-5-methyl-2-imidazolone (0.2 g.) were heated to 210° until carbon dioxide evolution stopped (5 minutes). The cooled residue was crystallized from methanol; M.P. 96–98°.

*Example 27.—1-(p-methoxyphenyl)-3-acetyl-5-methyl-2-imidazolone*

1-(p-methoxyphenyl)-5-methyl-2-imidazolone (1.0 g.) was refluxed with 10 ml. of acetanhydride for 1 hour. Excess acetic anhydride was then removed in vacuo. The residue crystallizes spontaneously and was recrystallized from ethanol; M.P. 130–131°. Yield quantitative.

Analysis for $C_{13}H_{14}N_2O_3$ (M.W. 224.26)—Calc'd: C, 63.40; H, 5.73. Found: C, 63.33; H, 5.81.

*Example 28.—1-(p-tolyl)-5-methyl-2-imidazolone*

1-(p-tolyl)-4-carbethoxy-5-methyl-2-imidazolone (32.4 g.) was saponified as described in Example 7 and decarboxylated in accordance with Example 11B. Yield of desired compound: 21.1 g. (90%); M.P. 190–192°; I.R. ($CHCl_3$): $\nu$ ($C=O$), 1680 cm.$^{-1}$.

Analysis for $C_{11}H_{12}N_2O$ (M.W. 188.22)—Calc'd: C, 70.18; H, 6.43, N, 14.88. Found: C, 69.99, H, 6.77; N, 14.52.

*Example 29.—1-(p-methoxyphenyl)-4-carboxamido-5-methyl-2-imidazolone*

1 - (p-methoxyphenyl)-4-carboxy-5-methyl-2-imidazolone (5.0 g.) was treated in 50 ml. dry benzene with 30 ml. of thionylchloride at reflux-temperature for 6 hours. Benzene and excess thionylchloride were then removed in vacuo and the residue treated with saturated ethanolic ammonia. After standing overnight, ethanol was removed in vacuo and the residue suspended in water, collected on a Büchner-funnel and recrystallized from ethanol. 2.8 g. of the desired compound, M.P. 314°, were obtained.

Analysis for $C_{12}H_{13}N_3O_3$ (M.W. 247.26)—Calc'd: C, 58.35, H, 5.32, N, 17.01. Found: C, 58.28; H, 5.49; N, 16.90.

*Example 30.—1-cyclohexyl-4-carboxy-5-methyl-2-imidazolone*

1-cyclohexyl-4-carbethoxy-5-methyl-2-imidazolone (30 g., 0.12 M—Example 23) was refluxed for one hour in 400 ml. of 3 N sodium hydroxide. Acidification with 6 N hydrochloric acid, filtration and recrystallization of the resulting precipitate gave 22.9 g., 86% of the desired compound; M.P. 210° (dec.).

Analysis for $C_{11}H_{16}N_2O_3$ (M.W. 224.25)—Calc'd: C, 58.28; H, 7.47; N, 11.33. Found: C, 58.24; H, 7.83; N, 11.45.

*Example 31.—1-cyclohexyl-5-methyl-2-imidazolone*

1-cyclohexyl-4-carboxy-5-methyl-2-imidazolone (18.0 g.—Example 30) was heated under stirring to 220° until the gas evolution ceased. A solution of the residue in 300 ml. of chloroform was extracted with three portions of 100 ml. in sodium bicarbonate, dried over magnesium sulfate and evaporated. Recrystallization of the residue from carbon tetrachloride gave 4.80 g., 33%, of the desired compound; M.P. 200°; I.R. (chloroform): ($C=O$), 1675 cm.$^{-1}$.

Analysis for $C_{10}H_{16}N_2O$ (N.W. 180.26)—Calc'd: C, 66.63; H, 8.95; N, 15.54. Found: C, 66.18; H, 8.98; N, 15.51.

*Example 32.—1-($\beta$-diethylaminoethyl)-4-carbethoxy-5-methyl-2-imidazolone*

N,N-diethylaminoethylamine (11.6 g.) is dissolved in 40 ml. of ethanol and an aqueous solution of 38% of formaldehyde is added (9 ml.; 10% excess). The mixture is heated to reflux for 30 minutes and then cooled to room temperature. A solution of 15.9 g. of ethylisonitrosoacetoacetate in 30 ml. of ethanol is then added at once and refluxing resumed for 8 hours. The solvent is then removed in vacuo and the dark residue dissolved in petroleum ether. The product crystallizes out spontaneously and is recrystallized several times from petroleumether; M.P. 79–80°. Yield: 6 g.

Analysis for $C_{13}H_{23}N_3O_3$ (M.W. 269.36)—Calc'd: C, 58.10; H, 8.62; N, 15.62. Found: C, 57.81; H, 8.72; N, 15.32.

*Example 33.—1-($\beta$-diethylaminoethyl)-4-carboxy-5-methyl-2-imidazolone*

1-($\beta$-diethylaminoethyl)-4-carbethoxy-5-methyl-2-imidazolone (10 g.) was saponified as described above. Yield: 4.5 g. of pure material; M.P. 202–203° (dec.).

Analysis for $C_{11}H_{19}N_3O_3$ (M.W. 241.31)—Calc'd: C, 54.80; H, 7.94; N, 17.43. Found: C, 54.86; H, 8.08; N, 17.23.

*Example 34.—1-($\beta$-diethylaminoethyl)-5-methyl-2-imidazolone*

1-($\beta$-diethylaminoethyl)-4-carboxy-5-methyl-2-imidazolone (13.0 g.) was decarboxylated as described above; M.P. 86–88°.

Analysis for $C_{10}H_{19}N_3O$ (M.W. 197.30)—Calc'd: C, 60.80; H, 9.71; N, 21.30. Found: C, 60.64; H, 9.66; N, 21.25.

*Example 35.—1-($\beta$-diethylaminoethyl)-5-methyl-2-imidazolone methyliodide*

1-($\beta$-diethylaminoethyl)-5-methyl-2-imidazolone 5.8 g. —Example 34) was dissolved in ether and a solution of 4.2 g. (1.85 ml.) of methyliodide in ether was added at room temperature. The mixture was kept for 2 days and the precipitated material was collected on a Büchner-funnel and washed with ether. Recrystallization from ethanol gave 4.6 g. of pure material; M.P. 180–181°.

Analysis for $C_{11}H_{22}IN_3O$ (M.W. 339.25)—Calc'd: C, 39.00; H, 6.54; I, 37.40; N, 12.40. Found: C, 38.79; H, 6.72; I, 37.49; N, 12.43.

*Example 36.—1-(p-acetoxyphenyl)-4-carbethoxy-5-methyl-2-imidazolone*

(A) p-*Nitrophenyl acetate* was prepared following the procedure of F. D. Chattaway, J. Chem. Soc., 2495 (1931) from p-nitrophenol. Yield: 75%; M.P. 77–79°; recrystallized from isopropanol.

(B) p-*Aminophenyl acetate*.—A mixture of p-nitrophenyl acetate (0.132 mole, 23.9 g.), palladium on charcoal (5%, 2.0 g.) and ethanol 2B (200 ml.) was hydrogenated at room temperature and 3 atm. pressure for one hour. The catalyst was removed by filtration through a Hy-flo bed and the solution was evaporated to dryness. The resulting residue was crystallized from isopropanol (30 ml.) and the crystalline product was washed free of coloration with isopropanol-hexane (1:2) to give the desired product (11.4 g.; M.P. 63–65°).

(C) *Desired compound*.—p-Aminophenyl acetate (0.11 mole, 17.0 g.) was dissolved in ethanol (45 ml.) and formaldehyde solution (37%, 0.135 mole, 10.8 ml.) was slowly added to the cooled solution. The mixture was then heated under reflux for 15 minutes and cooled. A solution of ethyl isonitrosoacetoacetate (0.11 mole, 18.0 g.) in ethanol (45 ml.) was added, the mixture was first stirred at room temperature for ½ hour and then heated under reflux for one hour. Crystallization occurred on cooling. Yield: 9.4 g.; M.P. 242–244°. U.V. (methanol): λ max.: 277 mμ, ε 18,000. (Methanol+sodium hydroxide): λ max.: 274 mμ, ε 18,000; 245 mμ, ε 11,400.

Analysis for $C_{15}H_{16}N_2O_3$ (M.W. 304.29)—Calc'd: C, 59.20; H, 5.30; N, 9.21. Found: C, 58.95; H, 5.42; N, 9.25.

*Example 37*.—*1-(p-hydroxyphenyl)-4-carboxy-5-methyl-2-imidazolone*

A. 1-(p-acetoxyphenyl)-4-carbethoxy-5-methyl-2-imidazolone (0.045 mole, 13.7 g.) was suspended in 3 N sodium hydroxide (150 ml.) and heated under reflux for two hours. The resulting solution was acidified with concentrated hydrochloric acid (to pH 1–2) and product (11.8 g., M.P. 270–272°) crystallized. Recrystallization from ethanol yielded 1-(p-hydroxyphenyl)-4-carboxy-5-methyl-2-imidazolone (9.7 g., transformation at ca. 240°, M.P. 278–279° dec.). U.V. (methanol): λ max.: 268 mμ, ε 16,000. (Methanol+sodium hydroxide): λ max.: 255 mμ.

B. The above compound (0.034 mole, 7.9 g.) was heated at 250° for 15 minutes. The tan residue was recrystallized from methanol (charcoal, 150 ml.) to yield the desired product (5.4 g., M.P. 281–283° dec.). Recrystallization from methanol (75 ml.) yielded a purer sample (3.74 g., M.P. 282–284° dec.). U.V. (methanol): λ max.: 270 mμ, ε 1600. (Methanol+sodium hydroxide): λ max.: 289 mμ; 245 mμ.

Analysis for $C_{10}H_{10}N_2O_2$ (M.W. 190.20)—Calc'd: C, 63.15; H, 5.30; N, 14.73. Found: C, 63.10; H, 5.29; N, 14.90.

*Example 38*.—*1-(o-chlorobenzyl)-4-carbethoxy-5-methyl-2-imidazolone*

2-chlorobenzylamine (0.025 mole, 3.54 g.) was dissolved in ethanol (10 ml.) and formaldehyde solution (37%, 0.03 mole, 2.4 ml.) was slowly added to the cooled solution. The mixture was then heated under reflux for 15 minutes and cooled. A solution of ethyl isonitrosoacetoacetate (0.025 mole, 4.0 g.) in ethanol (10 ml.) was added; the resulting mixture was first stirred at room temperature for ½ hour and then heated under reflux for 4 hours. Crystallization occurred on cooling; yield: 5.0 g.; M.P. 199–201.5°. Two recrystallizations from methanol (70 ml.) gave the desired compound (3.0 g., M.P. 200–202° dec.). U.V. (methanol): λ max.: 271 mμ, ε 14,500.

Analysis for $C_{14}H_{15}ClN_2O_3$ (M.W. 294.73)—Calc'd: C, 57.05; H, 5.13; N, 9.51; Cl, 12.03. Found: C, 57.00; H, 5.09; N, 9.79; Cl, 12.01.

*Example 39*.—*1-(o-chlorobenzyl)-5-methyl-2-imidazolone*

(A) *1 - (o-chlorobenzyl)-4-carboxy-5-methyl-2-imidazolone*.—A suspension of the compound of Example 38 (0.1 mole, 29.5 g.) was heated under reflux for two hours. The resulting crystalline product (M.P. 340° dec.) was removed by filtration through sintered glass funnel and resuspended in 3 N hydrochloric acid (300 ml.). The latter suspension was heated under reflux for 1 hour, the resulting solid was filtered off, washed with water and isopropyl alcohol to yield acid (24.7 g.; M.P. 243–244° dec.). Recrystallization from dimethylformamide (400 ml.) yielded the crystalline acid (24.5 g.; M.P. 247–248° dec.) containing dimethylformamide of crystallization. U.V. (methanol): λ max.: 261 mμ.

(B) *1 - (o-chlorobenzyl)-5-methyl-2-imidazolone*.—1-(o - chlorobenzyl)-4-carboxy-5-methyl - 2 - imidazolone (13.35 g.) was heated at 255° until melted (10 minutes); strong effervescence occurred and DMF vaporized. The desired product solidified on cooling and was recrystallized from ethanol (100 ml.). Yield: 8.1 g.; M.P. 208–211°. U.V. (methanol): λ max.: 262 mμ, ε 440.

Analysis for $C_{11}H_{11}ClN_2O$ (M.W. 222.68)—Calc'd: C, 59.33; H, 4.98; N, 12.58; Cl, 15.92. Found: C, 59.03; H, 4.79; N, 12.71; Cl, 15.95.

*Example 40*.—*1-(p-methoxyphenethyl)-4-carbethoxy-5-methyl-2-imidazolone* p-Methoxyphenethylamine (15.12 g.) was dissolved in 30 ml. of ethanol and 9.5 g. of 37% formaldehyde solution was added. The mixture was refluxed for 30 minutes, cooled and 15.9 g. of ethyl isonitrosoacetoacetate in 50 ml. of ethanol added and refluxing resumed for 8 hours. The solvent was then removed in vacuo and the residue triturated with ether. The precipitated material was collected on a Büchner-funnel and recrystallized from benzene/cyclohexane and then from methanol/water; M.P. 129–130°.

Analysis for $C_{16}H_{20}N_2O_4$ (M.W. 304.34)—Calc'd: C, 63.20; H, 6.62; N, 9.21. Found: C, 63.24; H, 6.49; N, 9.45.

*Example 41*.—*1 - (p-methoxyphenethyl)-5-methyl-2-imidazolone*

1-(p - methoxyphenethyl)-4-carboxy-5-methyl-2-imidazolone (7.6 g.—prepared by alkaline saponification of the compound of Example 40) was decarboxylated at 230°. The material was taken up in ethanol, treated with charcoal, filtered and the solvent removed in vacuo. The crystalline residue was recrystallized from methanol; M.P. 139–140°. Yield: 60%.

Analysis for $C_{13}H_{16}N_2O_2$ (M.W. 232.29—Calc'd: C, 67.25; H, 6.95; N, 12.05. Found: C, 67.19; H, 6.80; N, 12.15.

*Example 42*.—*1-(p-methylphenethyl)-4-carbethoxy-5-methyl-2-imidazolone* p-Methylphenethylamine (13.5 g.) was dissolved in 30 ml. of ethanol and 9.5 ml. 37% formaldehyde added. The mixture was refluxed for 30 minutes, cooled and 15.9 g. of ethyl isonitrosoacetoacetate dissolved in 50 ml. of ethanol added. The mixture was refluxed for 8 hours, all solvents removed in vacuo and the residue triturated with ether. The crude condensation product separates out and is repeatedly recrystallized from benzene/cyclohexane and finally sublimed in high vacuo; M.P. 146–147°.

Analysis for $C_{16}H_{20}N_2O_3$ (M.W. 288.34)—Calc'd: C, 66.65; H, 6.97; N, 9.71. Found: C, 66.26; H, 6.88; N, 9.95.

*Example 43*.—*1-(p-tolylethyl)-5-methyl-2-imidazolone*

1-(p-tolylethyl)-4-carboxy-5-methyl - 2 - imidazolone (13.5 g.—obtained from the corresponding carbethoxy compound by saponification) was decarboxylated at 205°. The crude material was dissolved in methanol and treated with charcoal. The filtrate was evacuated to dryness and the residue sublimed in high vacuum. The product so obtained was finally recrystallized from benzene. Yield: 4.5 g., M.P. 149–150°.

Analysis for $C_{13}H_{16}N_2O$ (M.W. 216.29)—Calc'd: C, 72.20; H, 7.46; N, 12.95. Found: C, 72.07; H, 7.46; N, 12.86.

*Example 44.—1-(p-trifluoromethylphenyl)-4-carbethoxy-5-methyl-2-imidazolone* p-Aminobenzotrifluoride (0.16 mole, 24.8 g.) was dissolved in ethanol (80 ml.). The solution was cooled, formaldehyde solution (37%, 19.4 ml.) was added and the mixture was then heated under reflux for 15 minutes. A solution of ethyl isonitrosoacetoacetate (0.20 mole, 32.3 g.) in ethanol (80 ml.) was added, the mixture was first stirred at room temperature for one-half hour and then heated under reflux for 17 hours. The desired product (16.5 g., M.P. 251–253°) crystallized on cooling. U.V. (methanol): λ max.: 280 mμ, ε 1.4×10⁴.

Analysis for $C_{14}H_{13}N_2O_3F_3$ (M.W. 314.26)—Calc'd: C, 53.50; H, 4.17; N, 8.91. Found: C, 53.64; H, 4.16; N, 8.85.

*Example 45.—1-(p-trifluoromethylphenyl)-5-methyl-2-imidazolone*

The compound of Example 44 was saponified to the corresponding acid (M.P. 267–268°, dec.) which was then decarboxylated to give the desired compound, M.P. 209–211°. U.V. (methanol): λ max.: 275 mμ, ε 2600.

Analysis for $C_{11}H_9F_3N_2O$ (M.W. 242.20)—Calc'd: C, 54.55; H, 3.75; N, 11.57. Found: C, 54.61; H, 3.85; N, 11.23.

*Example 46.—1-(p-acetylphenyl)-4-carbethoxy-5-methyl-2-imidazolone* p-Aminoacetophenone (0.5 mole, 67.5 g.), dissolved in ethanol (250 ml.) and formaldehyde solution (37%, 0.625 mole, 47.5 ml.) was condensed with ethyl isonitrosoacetoacetate (0.5 mole, 79.5 g.) in ethanol (250 ml.) as in Example 1A. The reaction product (28 g.) was recrystallized from ethanol (350 ml.) to yield the desired compound (22.6 g., M.P. 202–204°). U.V. (methanol): λ max.: 268 mμ, ε 14,000; 242 mμ, ε 16,000.

Analysis for $C_{15}H_{16}N_2O_4$ (M.W. 288.29)—Calc'd: C, 62.49; H, 5.59; N, 9.72. Found: C, 62.54; H, 5.68; N, 9.83.

*Example 47.—1-(p-acetylphenyl)-5-methyl-2-imidazolone*

The compound of Example 46 was saponified and decarboxylated as described above and the resulting product (2.6 g., M.P. 210–213°) was recrystallized from isopropanol (50 ml.) to give the desired compound (2.0 g., M.P. 210–212°). U.V. (methanol): λ max.: 295 mμ, ε 3,900; 241 mμ, ε 14,600.

*Example 48.—1-amphetaminyl-4-carboxy-5-methyl-2-imidazolone*

D-amphetamine (13.5 g.) was reacted with 8.9 ml. of 37% formaldehyde solution in 30 ml. of ethanol. After one-half hour refluxing the mixture was cooled, a solution of 16 g. ethyl isonitrosoacetoacetate in 20 ml. of ethanol added at once and refluxing resumed for 8 hours. The solvent was removed in vacuo and the dark residual oil directly saponified by boiling 10 hours with 150 ml. 3 N sodium hydroxide. The dark brown solution was cooled, extracted with ether and the aqueous phase treated with charcoal. The filtrate was acidified and the precipitated acid collected on a Büchner-funnel and washed with water. Repeated crystallization gave 15 g. of pure acid, M.P. 221–222° (dec.).

*Example 49.—1-(2,2-dimethoxyethyl)-4-carboxy-5-methyl-2-imidazolone*

1 - (2,2-dimethoxyethyl)-4-carbethoxy-5-methyl-2-imidazolone (10.8 g.—prepared by condensing aminoacetaldehydedimethylacetal, formaldehyde, and ethylisonitrosoacetoacetate; M.P. 106–107°) was refluxed 6 hours with 200 ml. 3 N sodium hydroxide. After cooling the solution was acidified. The precipitated acid was collected on a Büchner-funnel, washed with water and recrystallized from methanol, M.P. 195–196° (dec.). Yield: 8.2 g.

*Example 50.—1-(2,2-dimethoxyethyl)-5-methyl-2-imidazolone*

The compound of Example 49 was decarboxylated to the desired compound; M.P. 95–97°.

*Example 51.—1-(1'-methylbutyl)-4-carboxy-5-methyl-2-imidazolone*

A mixture of 17.4 g. 2-aminopentane and 17.8 ml. 37% formaldehyde solution was refluxed in 30 ml. of ethanol for one-half hour. After cooling a solution of 31.8 g. ethyl isonitrosoacetoacetate in 70 ml. of ethanol was added dropwise while stirring and refluxing then continued for 8 hours. The solvent was then removed in vacuo and the residue dissolved in 400 ml. 3 N sodium hydroxide. This solution is refluxed for 12 hours, cooled, cleared with charcoal, filtered and acidified. The precipitated acid is collected on a Büchner-funnel, washed with water and repeatedly recrystallized from methanol/water; M.P. 192–193° (dec.).

*Example 52.—1-(1'-ethylpropyl)-4-carboxy-5-methyl-2-imidazolone*

A mixture of 17.4 g. 3-aminopentane and 17.8 ml. 37% formaldehyde solution was refluxed in 30 ml. of ethanol for one-half hour. After cooling, a solution of 31.8 g. ethyl isonitrosoacetoacetate in 70 ml. of ethanol was dropped in while stirring and after the addition was complete, the mixture was refluxed for 8 hours. The reaction product was worked up to yield 9.7 g. of pure material, M.P. 211–212° (dec.).

*Example 53.—1-(1'-ethylpropyl)-5-methyl-2-imidazolone*

1 - (1'-ethylpropyl)-4-carboxy-5-methyl-2-imidazolone (6.4 g.) was decarboxylated at 220°. Yield: 3.5 g.; M.P. 108–109° of the desired compound.

*Example 54.—1-n-octyl-4-carboxy-5-methyl-2-imidazolone*

A mixture of 25.8 n-octylamine and 18 ml. 37% formaldehyde solution was refluxed in 50 ml. ethanol for one-half hour. After cooling a solution of 31.8 g. of ethyl isonitrosoacetoacetate in 70 ml. of ethanol was added all at once and refluxing continued for 8 hours. The solvent was then removed in vacuo and the reddish-brown syrupy residue directly saponified by refluxing it with 300 ml. 3 N sodium hydroxide for another 8 hours. After cooling, the resulting brown solution was worked up to yield 20 g. acid; M.P. 192–193° (dec.).

*Example 55.—1-n-octyl-5-methyl-2-imidazolone*

1 - (n-octyl)-4-carboxy-5-methyl-2-imidazolone (10.0 g.) was decarboxylated at 200°. The white material obtained after product work up was recrystallized from petroleum ether. Yield: 5.6 g.; M.P. 64–65°.

*Example 56.—Ethyl 1-(p-ethoxyphenyl)-5-methyl-2-imidazolone-4-carboxylate* p-Phenetidine (0.5 mole, 68.5 g.) was dissolved in ethanol (200 ml.). The solution was cooled, formaldehyde solution (37%, 48 ml.) was added and the mixture was then heated under reflux for 15 minutes. A solution of ethyl isonitrosoacetoacetate (0.5 mole, 80 g.) in ethanol (200 ml.) was added; the mixture was first stirred at room temperature for one-half hour and then heated under reflux for 8 hours. The reaction product (68.2 g., M.P. 180–182°) crystallized on cooling. Two recrystallizations from ethanol (400 ml.) gave desired product (51 g., M.P. 185–186°). U.V. (methanol): λ max.: 222 mμ, ε 8,900; 274 mμ, ε 19,000.

Example 57.—1-(p-ethoxyphenyl)-5-methyl-2-imidazolone

The compound of Example 56 was saponified to the corresponding acid (M.P. 240–241°, dec.) which was then decarboxylated to give the desired compound; M.P. 190–191°. U.V. (methanol): λ max.: 223 mμ, ε 13,400; shoulders at 272,245 mμ.

Example 58.—1-(p-fluorophenyl)-5-methyl-2-imidazolone (a) p-Fluoroaniline (0.5 mole, 55.5 g.) was dissolved in ethanol (200 ml.); the solution was cooled and formaldehyde solution (37%, 0.6 mole, 48 ml.) was added. The mixture was then heated under reflux for 15 minutes and cooled. A solution of ethyl isonitrosoacetoacetate (0.5 mole, 79.5 g.) in ethanol (200 ml.) was added. The resulting mixture was first stirred at room temperature for one-half hour and then heated under reflux for 8 hours. Product (42.7 g.; M.P. 205–207°) crystallized on cooling. Recrystallization from isopropanol (400 ml.) yielded 1-(p - fluorophenyl) - 4-carbethoxy-5-methyl-2-imidazolone (40.5 g.; M.P. 206–207°). U.V. (methanol): λ max.: 274 mμ, ε 15,500.

(b) The above compound (0.08 mole, 21.8 g.) was suspended in 3 N sodium hydroxide (300 ml.) and the mixture was heated under reflux for 2 hours. The resulting solution was cooled and acidified with conc. hydrochloric acid to pH 1–2. The acid that precipitated, 1-(p-fluorophenyl)-4-carboxy-5-methyl-2-imidazolone (19.3 g.; M.P. 239–240°) was directly decarboxylated at 250° to yield the desired product (7.4 g.; M.P. 218–223°). Recrystallization, first from isopropanol (100 ml., charcoal) and then from isopropanol-chloroform (9:1, 100 ml.) gave a purer sample (5.0 g.; M.P. 222–224°). U.V. (methanol): λ max.: 248 mμ, ε 2800.

Example 59.—1-(m-fluorophenyl)-5-methyl-2-imidazolone

The procedure of the preceding example was followed and the following products were obtained in sequence:

(1) 1-(m-fluorophenyl)-4-carbethoxy-5-methyl-2-imidazolone, M.P. 185–189°.

(2) 1 - (m-fluorophenyl)-4-carboxy-5-methyl-2-imidazolone, M.P. 220° (dec.)

(3) Desired final compound, M.P. 197–200°. U.V. (methanol): λ max.: 262 mμ, ε 3300.

Example 60.—1-(o-fluorophenyl)-5-methyl-2-imidazolone

The precedure of Example 58 was followed. Obtained were:

(1) 1-(o-fluorophenyl)-4-carbethoxy-5-methyl-2-imidazolone, M.P. 160–170°.

(2) 1 - (o - fluorophenyl)-4-carboxy-5-methyl-2-imidazolone, M.P. 237–238° (dec.).

(3) Desired final compound, M.P. 199–203°. U.V. (methanol): λ max.: 255 mμ, ε 6000.

Example 61.—1-[p-(methylthio)-phenyl]-5-methyl-2-imidazolone

The same precedure was followed and obtained were:

(1) 1-[p-(methylthio)phenyl]-4-carbethoxy-5-methyl-2-imidazolone, M.P. 202–205°, U.V. (methanol): λ max.: 278 mμ; ε 25,000.

(2) 1 - [p-(methylthio)phenyl]-4-carboxy-5-methyl-2-imidazolone, M.P. 247–248° (dec.).

(3) Desired final compound, M.P. 193–195°. U.V. (methanol): λ max.: 262 mμ; ε 15,000.

Analysis for $C_{11}H_{12}N_2OS$ (M.W. 220.30)—Calc'd: C, 59.97; H, 5.49; N, 12.72; S, 14.56. Found: C, 59.99; H, 5.75; N, 12.53; S, 14.40.

Example 62.—1-(4-cyanophenyl)-4-carbethoxy-5-methyl-2-imidazolone p-Aminobenzonitrile (0.5 mole, 59 g.) was suspended in ethanol (200 ml.); the suspension was cooled, formaldehyde solution (37%, 48 ml.) was added and the mixture was heated under reflux for 15 minutes. After cooling, a solution of ethyl isonitrosoacetoacetate (0.5 mole, 80 g.) in ethanol (100 ml.) was added, the mixture was first stirred at room temperature for one-half hour and then heated under reflux for 21 hours. The reaction-product (22.7 g., M.P. 236–7°) crystallized on cooling. Recrystallization from methanol (500 ml., charcoal) gave the desired compound (21.0 g., M.P. 238–40°). U.V. (methanol): λ max. 230 mμ (ε 18,000); 266 mμ (ε 13,000); 290 mμ (ε 11,000).

Example 63.—1-[2(N-hexamethyleneimino)ethyl]-4-carbethoxy-5-methyl-2-imidazolone hydrochloride (a) (N-hexamethyleneimino)acetonitrile.—This was prepared from hexamethyleneimine and chloroacetonitrile by the method of R. P. Mull et al., J. Org. Chem. 25, 1953 (1960); yield 90%, B.P. 101–4°/10 mm. $n_D^{23}$, 1.4728.

(b) 2-(N-hexamethyleneimino)ethylamine.—Reduction of the above nitrile with LiAlH₄ was described by H. Najer et al., Bl. Soc. Chim. France 1962, 557 (1962) yielded the desired product (yield, 70%, B.P. 34–6°/0.2 mm., $n_D^{23}$ 1.4790).

(c) 1-[2-(N-hexamethyleneimino)ethyl-4-carbethoxy-5 - methyl - 2 - imidazolone hydrochloride.—2-(N-hexamethyleneimino)ethylamine (0.25 mole, 35.5 g.) was dissolved in ethanol (75 ml.). The solution was cooled and formaldehyde solution (37%, 24 ml.) was added; the resulting mixture was heated under reflux for 15 minutes and allowed to cool to room temperature. A solution of ethyl isonitrosoacetoacetate (0.25 mole, 40 g.) in ethanol (125 ml.) was added. The reaction mixture was stirred at room temperature for one-half hour and then heated under reflux for 8 hours. The resulting black solution was treated with charcoal, ethanolic hydrochloric acid (10 N, 30 ml.) was added; the hot solution was again treated with charcoal and the volume was reduced to 250 mls. The reaction product (37.7 g.; M.P. 244–5° dec.) crystallized on cooling. A portion (5 g.) was recrystallized from ethanol (ca. 75 ml.) to yield the desired compound (4.5 g., M.P. 243–5° dec.). U.V. (methanol): λ max. 270 mμ (ε 14,000).

Analysis for $C_{15}H_{26}ClN_3O_3$ (M.W. 331.84)—Calc'd: C, 54.29; H, 7.90; N, 12.66; Cl, 10.68. Found: C, 54.43; H, 7.89; N, 12.92; Cl. 10.59.

Example 64.—1-[2-(N-hexamethyleneimino)ethyl]-5-methyl-2-imidazolone

The compounds of the preceding example was saponified to give the corresponding acid which was then decarboxylated to yield the desired compound; M.P. 90–92°.

Example 65.—1-[2-(N-pyrrolidino)ethyl]-4-carbethoxy-5-methyl-2-imidazolone hydrochloride N-(2-aminoethyl)pyrrolidine (0.15 mole, 17.1 g.) was dissolved in ethanol (60 ml.); the solution was cooled in ice bath, formaldehyde solution (33%, 14.4 ml.) was added; the mixture was heated under reflux for 15 minutes. After cooling to room temperature a solution of ethyl isonitrosoacetoacetate (0.15 mole, 24.0 g.) in ethanol (60 ml.) was added. The reaction product was worked up to give a crystalline compound (19.7 g.; M.P. 228–232°). Further recrystallization from ethanol-isopropanol (1:1, 200 ml., charcoal) gave the desired compound (15.4 g., M.P. 237–8° dec.). U.V. (methanol): λ max. 270 mμ (ε 13,000).

Example 66.—1-[2-(N-pyrrolidino)ethyl]-5-methyl-2-imidazolone

1 - [2 - (N - pyrrolidino)ethyl] - 4 - carbethoxy - 5-methyl-2-imidazolone hydrochloride (8.4 g.) was dissolved in 3 N sodium hydroxide (25 ml.) and heated under reflux for 2 hours. The solution was neutralized to pH 4 with dilute hydrochloric acid and evaporated to dryness. The residue was suspended in ethylene glycol (100 ml.) and the mixture was heated under reflux for 1½ hours. Water (100 ml.) was added, the mixture was rendered basic with saturated sodium carbonate solution to pH 8–9 and extracted with chloroform (3× 200 ml.). The chloroform extract was washed with water, dried over sodium sulfate and evaporated to dryness. The resulting oil (5.4 g.) was refluxed with ethyl acetate (100 ml.), insoluble oil was removed; the resulting solution was treated with charcoal and evaporated to dryness. The product (3.2 g., M.P. 88–92°) was crystallized from ethyl acetate-hexane (1:3, 40 ml.). Recrystallization from ethyl acetate (10 ml.) gave the desired compound (1.3 g., M.P. 100–102°). Mother liquors from recrystallizations were combined and refluxed with cyclohexane (50 ml.). Insoluble material was removed by filtration; the solution was treated with charcoal and evaporated to dryness. Two recrystallizations from ethyl acetate-cyclohexane (1:1, 10 ml.) gave additional compound (0.5 g., M.P. 98–101°).

*Example 67.—1-(3′,4′-dimethylphenyl)-5-methyl-2-imidazolone*

This product was obtained by the following syntheses:

(1) 3,4-dimethylaniline, formaldehyde and ethylisonitrosoacetate gave 1-(3′,4′-dimethylphenyl)-4-carbethoxy - 5 - methyl - 2 - imidazolone, M.P. 193–195°: U.V. (methanol): λ max.: 276 mµ; ε 18,000.

(2) Saponification of the ester gave 1-(3′,4′-dimethylphenyl) - 4 - carboxy - 5 - methyl - 2 - imidazolone, M.P. 246–248° dec.

(3) Decarboxylation of the acid gave the desired compound; M.P. 188–190°. U.V. (methanol): λ max. 245 mµ (ε 4400).

*Example 68.—1-(p-carbethoxyphenyl)-4-carbethoxy-5-methyl-2-imidazolone*

Ethyl p-aminobenzoate (0.3 mole, 49.5 g.) was dissolved in ethanol (120 ml.). The solution was cooled, formaldehyde solution (37%, 0.36 mole, 28.8 ml.) was added and the mixture was heated under reflux for 15 minutes. After cooling, a solution of ethyl isonitrosoacetoacetate (0.3 mole, 48.0 g.) in ethanol (120 ml.) was added. The mixture was first stirred at room temperature for one-half hour and then heated under reflux for 60 hours. The reaction product (23.1 g., M.P. 186–187°) crystallized on cooling. Recrystallization from methanol (75 ml.) gave the desired compound (21.2 g.) U.V. (methanol): λ max. 230 mµ (ε 17,000); 274 mµ (ε 14,000).

*Example 69.—1-(m-nitrophenyl)-5-methyl-2-imidazolone*

1 - (m - nitrophenyl) - 4 - carboxy - 5 - methyl - 2 - imidazolone (5 g., M.P. 259° dec. prepared from the compound of Example 4 by saponification) was refluxed for 2 hours in 100 ml. ethanol glycol in the presence of copper powder. After cooling the solution was filtered with suction and the filtrate freed in vacuo from ethylene glycol at 130°/2 mm.; the residue was taken up in chloroform, the latter washed with saturated sodium sulfate and 3 N hydrochloric acid and water, dried over sodium sulfate and chloroform removed in vacuo. The crystalline residue was recrystallized from methanol and yielded 2.6 g. of material (63%); M.P. 205–208° (darkening).

*Example 70.—1-(p-carboxyphenyl)-5-methyl-2-imidazolone*

(a) A suspension of 1-(p-carbethoxyphenyl)-4-carbethoxy-5-methyl-2-imidazolone (Example 68, 0.5 mole, 15.9 g.) in 3 N sodium hydroxide (150 ml.) was heated under reflux for 2 hours. The resulting solution was cooled and acidified with concentrated hydrochloric acid to pH 1. The acid, 1-(p-carboxyphenyl)-4-carboxy-5-methyl-2-imidazolone (14.5 g., M.P. 266–267° dec.) that precipitated was directly decarboxylated.

(b) This acid (13.5 g.) was suspended in ethylene glycol (300 ml.) and heated first at 220° for one hour, then at 190° for an additional hour. The ethylene glycol was removed by distillation under high vacuum. Isopropanol (50 ml.) was added to the residue. The precipitate formed (1st crop: 6.9 g., M.P. 275–276° dec.; 2nd crop: 1.4 g., M.P. 262° dec.) was dissolved in methanol-water (1:2, 300 ml.). The hot solution was treated with charcoal and evaporated to smaller volume (ca. 150 ml.). Crystallization occurred on cooling. Yield of the desired compound: 6.4 g.; M.P. 281–283° dec. U.V. (methanol): λ max: 227 mµ, ε 16,000, 281 mµ, ε 4000.

*Example 71.—1-cyclopentyl-5-methyl-2-imidazolone*

(a) Cyclopentylamine (0.5 mole, 42.5 g.) was dissolved in ethanol (200 ml.); the solution was cooled, formaldehyde solution (37%, 0.6 mole; 48 ml.) was added and the mixture was heated under reflux for 15 minutes. After cooling, a solution of ethyl isonitrosoacetoacetate in ethanol (200 ml.) was added; the mixture was first stirred at room temperature for one-half hour and then heated under reflux for 8 hours. The resulting reaction product was worked up to give 1-cyclopentyl - 4 - carbethoxy - 5 - methyl - 2 - imidazolone; 37.9 g., M.P. 148–151°. U.V. (methanol): λ max.: 275 mµ, ε 14,000.

(b) This ester (0.08 mole, 19.1 g.) was suspended in 3 N sodium hydroxide (150 ml.) and the mixture was heated under reflux for two hours. The resulting solution was cooled and acidified with conc. hydrochloric acid to pH 1–2. The acid, 1-cyclopentyl-4-carboxy-5-methyl-2-imidazolone that precipitated (17.5 g., M.P. 190–191°) was directly decarboxylated.

(c) This acid (17.5 g. wet) was heated to melting and maintained at 200–220° for 5 minutes (until evolution of carbon dioxide ceased). The resulting material was dissolved in chloroform (250 ml.); the chloroform solution was washed first with 5% sodium bicarbonate solution, then with water, dried over sodium sulfate and evaporated to dryness. The resulting solid (11.5 g.) was dissolved in isopropanol. The solution was treated with charcoal and re-evaporated to dryness. The product was crystallized from ethyl acetate (50 ml.); first crop: 8.3 g., M.P. 166–169°; second crop: 1.2 g., M.P. 164–168°). Two additional recrystallizations from ethyl acetate gave the desired compound (5.0 g., M.P. 169–171°). U.V. (methanol): λ max.: 213 mµ.

*Example 72.—1-allyl-5-methyl-2-imidazolone*

(a) A mixture of 5.70 g. of allylamine and 8.35 ml. of 37% formaldehyde solution in 30 ml. of ethanol was stirred for 20 minutes at room temperature. 15.9 g. of ethyl isonitrosoacetoacetate in 50 ml. ethanol was dropped in and the mixture refluxed 8 hours with stirring. After cooling, the ethanol was removed in vacuo. The residue crystallized spontaneously and was recrystallized twice from ethyl acetate. Yield of 1-allyl-4-carbethoxy-5-methyl-2-imidazolone: 8.0 g., M.P. 125–126°.

(b) This ester (25.8 g.) was refluxed with 400 ml. 3 N sodium hydroxide for 6 hours. After cooling, the mixture was acidified with 3 N hydrochloric acid. The acid separated slowly. It was collected on a Buchner funnel and washed with water. Recrystallization from water gave 20 g. of 1-allyl-4-carboxy-5-methyl-2-imidazolone; M.P. 190–191° (dec.)

(c) This acid (10 g.) was decarboxylated at 190°. When the reaction subsided, the mixture was cooled and taken up in chloroform. The solution was washed with saturated sodium bicarbonate and water, dried over sodium sulfate and stripped of solvent in vacuo. The residue weighed 5.7 g. and was crystalline. It was recrystallized from benzene-hexane, M.P. 101–104°. For final purification the desired material was sublimed in high vacuo, M.P. 113–115°.

Example 73.—1-(m-methylphenyl)-5-methyl-2-imidazolone

This product was synthesized via the following intermediates:

(1) 1-(m-methylphenyl)-4-carbethoxy-5-methyl-2-imidazolone, M.P. 209–212°. U.V. (methanol): λ max.: 276 mµ, ε 16,000.

(2) 1-(m-methylphenyl)-4 - carboxy-5-methyl-2-imidazolone, M.P. 215–216° dec.

The desired final compound melted at 205–208°. U.V. (methanol): λ max.: 245 mµ, ε 4000.

Example 74.—1-(3′,4′,5′-trimethoxyphenyl)-5-methyl-2-imidazolone (a) 3,4,5-trimethoxyaniline (0.26 mole, 47.6 g.) was suspended in water (100 ml.), and formaldehyde solution (37%, 0.31 mole, 25.0 ml.) was added to the cooled suspension. The mixture was then heated under reflux for 15 minutes and cooled. Ethyl isonitrosoacetoacetate (0.26 mole, 41.6 g.) and water (100 ml.) were added. The reaction mixture was stirred at room temperature for one half hour and then heated under reflux for twenty hours. The brown reaction product was worked up to give the desired 1-(3′,4′-5′-trimethoxyphenyl)4-carbethoxy-5-methyl-2-imidazolone (23.4 g.; M.P. 260–263°). U.V. (methanol): λ max.: 276 mµ, ε 17,800.

(b) A suspension of this ester (0.052 mole, 17.5 g.) in 3 N sodium hydroxide (165 ml.) was treated under reflux for 2 hours. The resulting solution was acidified with conc. hydrochloric acid to pH 1–2. The desired acid 1-(3′,4′,5′-trimethoxyphenyl) - 4-carboxy-5-methyl-2-imidazolone, (17.0 g., M.P. 240–244° dec.) precipitated; this was directly decarboxylated.

(c) The above acid (17.0 g.) was heated to melting and maintained at 245° for 2–3 minutes. The resulting residue was dissolved in methanol, the solution was treated with charcoal and evaporated to dryness. This reaction product was dissolved in chloroform (250 ml.) and the chloroform solution was twice extracted with 5% sodium bicarbonate (100 ml.). The chloroform solution was washed with water, dried over sodium sulfate and evaporated to dryness. Recrystallization of the residue (11.4 g.) from isopropanol (charcoal, 75 ml.) gave desired compound (10.1 g., M.P. 194–8°). Further recrystallization from isopropanol (ca. 75 ml.) yielded a purer sample (8.25 g., M.P. 196–9°). U.V. (methanol): λ max.: 251 mµ, ε 5000.

Example 75.—1-[4-(methoxymethyl)phenyl] - 4-carbethoxy-5-methyl-2-imidazolone (a) p-nitrobenzylmethyl ether—A solution of sodium methoxide (0.525 mole, 28.3 g.) in anhydrous methanol (300 ml.) was added dropwise to a suspension of p-nitrobenzyl bromide (9.525 mole, 113.4 g.) in methanol (525 ml.). The mixture was stirred at room temperature overnight. The resulting solution was neutralized to pH 7 with glacial acetic acid and evaporated to dryness. The residue was suspended in water (300 ml.) and extracted with chloroform (3× 500 ml.). The cholorform extract was washed with water, dried over sodium sulfate and evaporated to dryness. The resulting oil (93 g.) was distilled under high vacuum to give the desired intermediate product (82 g., M.P. 90–5°/0.25 mm., $n_D^{24}$ 1.546, M.P. ca. 28°).

(b) p-nitrobenzyl methyl ether (0.025 mole, 4.15 g.) was dissolved in ethanol (100 ml.). Palladium on charcoal catalyst (5%, 0.25 g.) was added and the mixture was hydrogenated at room temperature and 3 atm. pressure for one hour. The catalyst was removed by filtration and the ethanolic solution was evaporated to dryness. The resulting crude oil was redissolved in ethanol (10 ml.), formaldehyde solution (37%, 0.03 mole, 2.35 ml.) was added and the mixture was heated under reflux for 15 minutes. The mixture was cooled, ethyl isonitrosoacetoacetate (0.025 mole, 4.0 g.) and water (10 ml.) were added. The mixture was stirred at room temperature for ½ hour and was then heated under reflux for 10 hours. The reaction product was extracted with chloroform and the chloroform extract was evaporated to dryness. The resulting oil was suspended in isopropanol (200 ml.), insoluble material was filtered off, the filtrate was treated with charcoal and evaporated to dryness. The product was crystallized from ethyl acetate (15 ml.) to give the desired compound (1.2 g., M.P. 154–6°). Two recrystallizations from ethyl acetate (10–15 ml.) gave a purer sample (M.P. 157–159°).

Example 76.—1-[1-(3,3-ethylenedioxybutyl)]-5-methyl-2-imidazolone (a) 1-amino-3,3-ethylenedioxybutane was prepared as previously described by A. M. Islam and R. A. Raphael, J. Chem. Soc. 1955, 3131.

(b) 1-[1-(3,3-ethylenedioxybutyl)] - 4 - carbethoxy-5-methyl-2-imidazolone. 1-amino-3,3-ethylenedioxy butane (0.3 mole, 39.3 g.) was dissolved in ethanol (120 ml.); the solution was cooled, formaldehyde solution (37%, 0.36 mole, 28.8 ml.) was added and the mixture was heated under reflux for 15 minutes. After cooling, a solution of ethyl isonitrosoacetoacetate (redistilled, 0.3 mole, 48.0 g.) in ethanol (120 ml.) was added. The mixture was stirred at room temperature for ½ hour and then heated under reflux for 8 hours. The reaction product (55.0 g., M.P. 178–80°) crystallized on cooling. A portion (5 g.) was recrystallized from ethanol (50 ml.) to give screening sample (4.78 g., M.P. 178–80°). U.V. (methanol): λ max.: 274 mµ, ε 15,000.

(c) A suspension of the above ester (0.1 mole, 28.4 g.) in 3 N sodium hydroxide (200 ml.) was heated under reflux for 2 hours. The resulting solution was carefully acidified at pH 2 with conc. hydrochloric acid and the acid, 1 - [1 - (3,3 - ethylenedioxybutyl)]-4-carboxy-5-methyl-2-imidazolone that crystallized (23.3 g., M.P. 193–5°) was immediately filtered off and washed with water.

(d) The above crude acid (0.03 mole, 7.7 g.) was melted and maintained in the molten state at 200° for 5 minutes. The residue was dissolved in methanol (75 ml.), the solution was treated with charcoal and evaporated to dryness. The residue was dissolved in chloroform (100 ml.), the chloroform solution was first washed with 5% sodium bicarbonate solution (10 ml.), then washed with water, dried over sodium sulfate and evaporated to dryness. Two recrystallizations from ethyl acetate (25 ml.) yielded the desired compound (4.3 g., M.P. 134–6°).

Example 77.—1-butyl-5-phenyl-2-imidazolone (a) n-Butylamine (0.25 mole, 18.25 g.) was suspended in water (100 ml.); formaldehyde (37% solution, 0.30 mole, 24.0 ml.) was added, the suspension was heated under reflux for 15 minutes and cooled. Ethyl isonitrosobenzoyl acetate (0.25 mole, 55.25 g.) and water (100 ml.) were added. The reaction mixture was stirred at room temperature for ½ hour and then heated under reflux for 20 hours. The suspension was extracted with chloroform (3× 150 ml.); the chloroform extract was washed with water, dried over sodium sulfate and evaporated to dryness. A suspension of the resulting oil in 3 N sodium hydroxide (375 ml.) was heated under reflux for 2 hours, then extracted with ether (4× 200 ml.). The resulting solution was acidified with concentrated hydrochloric acid to pH 1–2 and the suspension was extracted with chloroform (3× 250 ml.). The chloroform extract was washed with water, dried over sodium sulfate and evaporated to dryness. The reaction product, 1 - butyl - 4 - carboxy-5-phenyl-2-imidazolone, (13.4 g., M.P. 222–225° dec.) was crystallized from ethyl acetate (125 ml.). Recrystallization from isopropanol (150 ml., charcoal) yields a purer product (11.4 g., M.P. 226–228° dec.). U.V. (methanol): λ max.: 225 mμ, ε 9500; 282 mμ, ε 9300.

(b) The above acid was heated at 230° until melted and maintained at that temperature for 4 minutes (until evolution of carbon dioxide subsided). The residual oil was dissolved in methanol (200 ml.), the methanolic solution was treated with charcoal and evaporated to dryness. The desired reaction product (4.8 g., M.P. 102–104°; 1.5 g., M.P. 99–101°) was crystallized from cyclopropane (15 ml.). Recrystallization from cyclohexane (15 ml.) yielded a purer product (5.6 g., M.P. 102–104°). U.V. (methanol): λ max.: 272 mμ, ε 7600.

*Example 78.—1-(p-fluorophenyl)-4-carbethoxy-5-phenyl-2-imidazolone* p-Fluoroaniline (0.4 mole, 44.4 g.) was suspended in water (160 ml.), formaldehyde (37% solution, 0.48 mole, 38.4 ml.) was added. The mixture was then heated under reflux for 15 minutes and cooled. Ethyl isonitrobenzoylacetate (0.4 mole, 88.4 g.) and water (160 ml.) were added. The suspension was stirred at room temperature for ½ hour and then heated under reflux for 21 hours. The mixture was extracted with chloroform (3 × 400 ml.), the chloroform extract was washed with water, dried over sodium sulfate and evaporated to dryness. The desired product (24.7 g., M.P. 249–251°) was crystallized from benzene (150 ml.). Two recrystallizations of a portion (4 g.) from ethanol (200 ml., charcoal) yielded a purer compound (3 g., M.P. 251–253°). U.V. (methanol): λ max.: 289 mμ, ε 12,000.

What is claimed is:

1. A compound of the formula

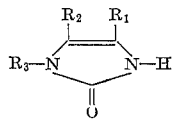

wherein $R_1$ is hydrogen, lower alkyl, lower hydroxyalkyl, carboxy, lower carbalkoxy, carboxamido, lower alkanoyl or cyano;

$R_2$ is lower alkyl or phenyl;

$R_3$ is alkyl of up to 12 carbon atoms, lower alkenyl, cycloalkyl of between 5 and 7 carbon atoms, ω,ω-di(lower)-alkoxy(lower)alkylene, ω-amino(lower)alkyl, phenyl-(lower)alkyl or phenyl, biphenyl and naphthyl, said phenyl, biphenyl and naphthyl groups carrying from one to three substituents selected from halogen, trifluoromethyl, lower alkyl, lower alkenyl, lower alkoxy-(lower)alkyl, hydroxy, lower alkoxy, lower carbalkoxy, carboxy, lower alkanoyl, lower alkanoyloxy, cyano, nitro, amino, lower acylamido, lower dialkylamino, lower dialkylamino(lower)alkyl or lower alkylmercapto.

2. 1-(p-methoxyphenyl)-5-methyl-2-imidazolone.
3. 1-(p-chlorophenyl)-5-methyl-2-imidazolone.
4. 1-phenyl-5-methyl-2-imidazolone.
5. 1-butyl-4-carbethoxy-5-methyl-2-imidazolone.
6. 1-butyl-4-carboxy-5-methyl-2-imidazolone.
7. 1-butyl-5-methyl-2-imidazolone.
8. 1-(p-tolyl)-5-methyl-2-imidazolone.
9. 1-(o-chlorobenzyl)-4-carbethoxy-5-methyl-2-imidazolone.
10. 1-(p-tolylethyl)-5-methyl-2-imidazolone.
11. 1-(2′,2′-dimethoxyethyl)-4-carbethoxy-5-methyl-2-imidazolone.
12. 1-(2′,2′-dimethoxyethyl)-4-carboxy-5-methyl-2-imidazolone.
13. 1-(2′,2′-dimethoxyethyl)-5-methyl-2-imidazolone.
14. 1-(p-ethoxyphenyl)-5-methyl-2-imidazolone.
15. 1-(1′-ethylpropyl)-5-methyl-2-imidazolone.
16. 1-(p-fluorophenyl)-5-methyl-2-imidazolone.
17. 1-(p-trifluoromethylphenyl)-5-methyl-2-imidazolone.
18. 1-(3′,4′-dimethylphenyl)-5-methyl-2-imidazolone.
19. 1-(p-carboxyphenyl)-5-methyl-2-imidazolone.
20. 1-cyclopentyl-5-methyl-2-imidazolone.
21. 1-[p-(methylthio)phenyl]-5-methyl-2-imidazolone.
22. 1-(m-nitrophenyl)-5-methyl-2-imidazolone.
23. The method of preparing a compound of the formula

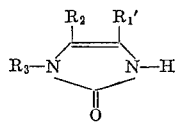

wherein $R_1'$ is lower alkyl, lower carbalkoxy, carboxamido, lower alkanoyl or cyano;

$R_2$ is lower alkyl or phenyl, and $R_3$ is alkyl of up to 12 carbon atoms, lower alkenyl, cycloalkyl of between 5 and 7 carbon atoms, ω,ω-di(lower)-alkoxy(lower)alkylene, ω-amino(lower)alkyl, phenylalkoxy(lower)alkylene, ω-amino(lower)alkyl, phenyl (lower)alkyl or aryl, the phenyl and aryl groups carrying from one to three substituents selected from halogen, trifluoromethyl, lower alkyl, lower alkenyl, lower alkoxy(lower)alkyl, hydroxy, lower alkoxy, lower carbalkoxy, carboxy, lower alkanoyl, lower alkanoyloxy, cyano, nitro, amino, lower acylamido, lower dialkylamino, lower dialkylamino(lower)alkyl or lower alkylmercapto, which comprises reacting in a polar solvent a formaldehyde, a primary amine of the formula $R_3NH_2$ and an α-isonitrosoketone of the formula

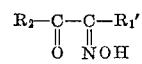

wherein $R_1'$, $R_2$ and $R_3$ are as defined hereinabove.

24. A compound of the formula

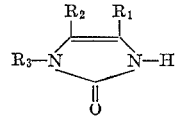

wherein $R_1$ is hydrogen or lower alkyl;

$R_2$ is lower alkyl or phenyl;

$R_3$ is alkyl of up to 12 carbon atoms, lower alkenyl, cycloalkyl of between 5 and 7 carbon atoms, ω,ω-di(lower)-(lower)alkyl or phenyl, biphenyl and naphthyl, said phenyl, biphenyl and naphthyl groups carrying from one to three substituents selected from halogen, trifluoromethyl, lower alkyl, lower alkenyl, lower alkoxy-(lower)alkyl, hydroxy, lower alkoxy, lower carbalkoxy, carboxy, lower alkanoyl, lower alkanoyloxy, cyano, nitro, amino, lower acylamido, lower dialkylamino, lower dialkylamino(lower)alkyl or lower alkylmercapto.

References Cited by the Examiner

UNITED STATES PATENTS

| | | | |
|---|---|---|---|
| 2,441,933 | 5/1948 | Duschinsky | 260—309.6 |
| 2,468,324 | 4/1949 | Duschinsky | 260—309.6 |
| 3,136,776 | 6/1964 | Stoffel | 260—309.6 |

OTHER REFERENCES

Fritsch Berichte, volume 26, pages 427–28 (1893).
Grompper et al.: Chemische Berichte, volume 92, page 1947 (1959).

WALTER A. MODANCE, *Primary Examiner.*

N. TROUSOF, *Assistant Examiner.*

UNITED STATES PATENT OFFICE
CERTIFICATE OF CORRECTION

Patent No. 3,303,199                                            February 7, 1967

Karl J. Doebel et al.

It is hereby certified that error appears in the above numbered patent requiring correction and that the said Letters Patent should read as corrected below.

Column 2, lines 10 to 12, for the upper right-hand portion of the formula reading $\diagup R_1$ read $\diagup R_1'$ column 7, line 49, for "$\lambda_1$ max" read -- $\lambda_2$ max --; column 19, line 54, for "(9,525 mole, 113.4 g.)" read -- (0,525 mole, 113.4 g.) --; column 22, line 23, strike out "alkoxy(lower)alkylene, ω-amino(lower)alkyl, phenyl-", and insert the same after "lower)-" in line 50, same column 22.

Signed and sealed this 14th day of November 1967.

(SEAL)
Attest:

Edward M. Fletcher, Jr.                                       EDWARD J. BRENNER
Attesting Officer                                                Commissioner of Patents